(12) United States Patent
Mariman et al.

(10) Patent No.: US 6,994,038 B2
(45) Date of Patent: Feb. 7, 2006

(54) AGRICULTURAL MACHINE WITH VARIABLE PRESSURE PRODUCT DISTRIBUTION SYSTEM

(75) Inventors: Nathan Albert Mariman, Geneseo, IL (US); Matthew Brian Hagen, Bettendorf, IA (US); Christopher Allen Myers, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/832,093

(22) Filed: Apr. 26, 2004

(65) Prior Publication Data

US 2005/0235890 A1 Oct. 27, 2005

(51) Int. Cl.
*A01C 7/00* (2006.01)
*A01C 9/00* (2006.01)

(52) U.S. Cl. .................................... 111/174; 111/186
(58) Field of Classification Search ................ 111/170, 111/174–176, 180, 185, 186; 221/211
See application file for complete search history.

(56) References Cited

U.S. PATENT DOCUMENTS

| | | | |
|---|---|---|---|
| 5,592,889 A | * | 1/1997 | Bourgault .................... 111/174 |
| 6,047,652 A | | 4/2000 | Prairie et al. |
| 6,609,468 B1 | | 8/2003 | Meyer et al. |

OTHER PUBLICATIONS

John Deere Company, John Deere 60 Seed Cart (2 pages), date unknown.

Case Corporation, Case IH Concord Air Till Drill Systems, 1996, (28 pages).
AGCO, White 6800 Series Central Fill Narrow Row Planting System, 1995, (2 pages).
CNH, Flexi-Coil Air Carts, How Does Air Delivery Work?, (2 pages), date unknown.
John Deere Company, 1900 Commodity Cart, Jun. 1997, (7 pages).

* cited by examiner

*Primary Examiner*—Christopher J. Novosad
(74) *Attorney, Agent, or Firm*—The Law Office of Randall T. Erickson, P.C.

(57) ABSTRACT

A product-on-demand delivery system for agricultural product overcomes the problem of over pressuring near application units in order to achieve sufficient pressure to feed further application units. The invention provides two or more main hoppers, each hopper pressurized to a different level by a fan that charges the air nozzles on the hoppers. The near row application units have product delivery hoses that are coupled to a first hopper. The far row application units have longer product delivery hoses that are coupled to a second hopper. The fan charging the second hopper is configured to pressurize the second hopper to a higher pressure than the pressure of the first hopper. The invention provides separate product-on-demand delivery systems to better control the product flow to the row application units on the machine. A product-on-demand delivery system is also provided that can dispense two different products from two main hoppers operated at different pressures.

15 Claims, 13 Drawing Sheets

AGRICULTURAL MACHINE WITH VARIABLE PRESSURE PRODUCT DISTRIBUTION SYSTEM

FIELD OF THE INVENTION

The present invention is directed to an agricultural machine with a variable pressure product distribution system for evenly distributing product onto a farm field. Particularly, the present invention relates to a delivery system on a planter machine that utilizes air pressure to distribute product, such as seed, simultaneously to a plurality of furrows as the planting machine is transported through the farm field.

BACKGROUND OF THE INVENTION

Pneumatic product-on-demand delivery systems have been used on agricultural seeding machines to automatically direct seed from a main seed hopper to a plurality of individual planting units. Each of the individual planting units has an auxiliary seed hopper for receiving the seed, a seed meter for metering the seed from the auxiliary seed hopper and a furrow opener for forming a planting furrow into which the metered seed is deposited. A fan is used to create pressurized air that forms an air stream on which the seed is taken to the planting units. These systems automatically replenish the auxiliary hoppers as needed.

The commercially available seed on demand delivery systems typically require a large fan to create the air stream. The large fan is required because of the pressure losses in the pneumatic system caused by abrupt changes in direction by the air stream in the main hopper.

Another system is described in U.S. Pat. No. 6,609,468, herein incorporated by reference. According to this patent, a product-on-demand delivery system is configured wherein the air stream passing through the main hopper is not subjected to the abrupt changes in direction.

The product-on-demand delivery system of the patent comprises a frame having a main hopper and an application unit. An air pump directs pressurized air to a manifold where the pressurized air is distributed to a plurality of air supply hoses. The air supply hoses are coupled to air inlets located on the bottom of the main hopper. Opposite the air inlets are corresponding product outlets for receiving the air streams with product, such as seed, entrained in the air stream. The product outlets are coupled to product supply hoses that are in turn coupled to auxiliary hoppers located on the application units. The bottom of the main hopper is concave and has outwardly diverging side walls. The air inlet is downwardly angled relative to the bottom and the product outlet is upwardly angled relative to the bottom.

Peaked baffles are located above corresponding air inlets and outlets so that product "puddles" form beneath the baffles. Gaps are formed between adjacent baffles so that product from the main hopper can flow into the product puddles.

The product-on-demand delivery system of this patent can be used to supply seed from a main seed hopper to auxiliary seed hoppers located on a planting unit. The planting unit includes auxiliary seed hoppers that each supply seed to a respective seed meter, each of which directs metered seed to a planting furrow formed by a furrow opener.

Typically, seed air delivery systems use a common fan to deliver air to the complete planter. In a typical air delivery system for a bulk seed planter that supplies a plurality of application units, there is required a minimum level of air pressure to deliver the seed to the furthest row application unit from the main hopper or tank. The fan is turned up to that level to ensure adequate delivery of seed to all application units of the machine. Due to this fact, however, the closest row units that are fed by shorter seed delivery hoses can be subjected to greater flow rates or higher pressures. It is difficult to prevent the closest row units from being overfilled.

The present inventors have recognized that it would be desirable to provide a product-on-demand delivery system that provides product to plural application units and supplies a correct amount of product from the main hopper to both distant application units and near application units. The present inventors have recognized that it would be desirable to provide a product-on-demand delivery system that delivers product, such as seed, from main hoppers to application units that reduced the probability of overfilling and plugging.

The present inventors have recognized that it would be desirable to provide a product-on-demand delivery system that could be used to simultaneously apply different products to different groups of rows in the field. The different products could be different kinds of seed varieties, treatments, shapes, sizes, etc., or different crops.

SUMMARY OF THE INVENTION

The invention provides a product-on-demand delivery system for agricultural product that overcomes the problem of over pressuring near application units in order to achieve sufficient pressure to feed further application units. The invention provides two or more main hoppers, each hopper pressurized to a different level by a fan that charges the air nozzles on the hoppers. The near row application units have product delivery hoses that are coupled to a first hopper. The far row application units have longer product delivery hoses that are coupled to a second hopper. The fan charging the second hopper is configured to pressurize the second hopper to a higher pressure than the pressure of the first hopper. The invention provides separate product-on-demand delivery systems to better control the product flow to the row application units on the machine.

The invention provides a product-on-demand delivery system for agricultural product, said system including a frame, a first main hopper mounted on the frame, a second main hopper mounted on the frame, a first application unit and a second application unit mounted to the frame, at least one air pump.

Each of the first and second main hoppers has a nozzle with a product opening into which product in the respective main hopper is directed. The nozzle has an air inlet for the introduction of pressurized air, and a product outlet for the export of pressurized air and entrained product.

Each of the first application unit and the second application unit has a product meter for dispensing the product onto a field. The product meter of the first application unit is in communication with the first main hopper, and the product meter of the second application unit is in communication with the second main hopper.

According to one aspect of the invention the air pump comprises two air pumps: a first air pump flow-coupled to the air inlet of the nozzle of the first main hopper, and a second air pump flow-coupled to the air inlet of the nozzle of the second main hopper.

Preferably, the second air pump generates a higher air pressure than said first air pump. The second main hopper is maintained at a higher operating pressure than said first main hopper. The meter of the second application unit is further from said second main hopper than said meter of the first application unit is from said first main hopper.

According to another embodiment of the invention, the air pump is a common air pump serving the first and second main hoppers and wherein a flow restriction is located between the common pump and the air inlet of the nozzle of the first main hopper. The restriction is configured to depress the air pressure within said first main hopper to a lower level than the air pressure within said second main hopper.

According to another embodiment the air pump is a common air pump serving the first and second main hoppers and wherein a flow restriction is located between the common pump and each inlet of the nozzle of the first and second main hoppers. The flow restriction can be selected such that the operating pressure within the first and second main hoppers can be varied.

The invention is particularly advantageous when the application units are planting units and the product is seed. Preferably, an auxiliary seed hopper is arranged at each planting unit between the hose and the meter.

The invention reduces the occurrence of overfilling and plugging in the product delivery hoses. The invention also allows the machine operator to control the hopper pressure to separate areas of the machine to easily compensate for different field conditions, such as side hills that require more hopper pressure to deliver product to the outer row units.

According to another aspect of the invention the first main hopper can be filled with a first product and the second main hopper can be filled with a second, different product. The first main hopper can deliver product to a first group of application units and the second main hopper can deliver product to a second group of application units. The first and second application units can be located on opposing lateral sides of the agricultural machine to apply product to different portions of the field rows. The different products can be different kinds of seeds with different treatments, or shapes, sizes, etc. The different products could be different crops.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
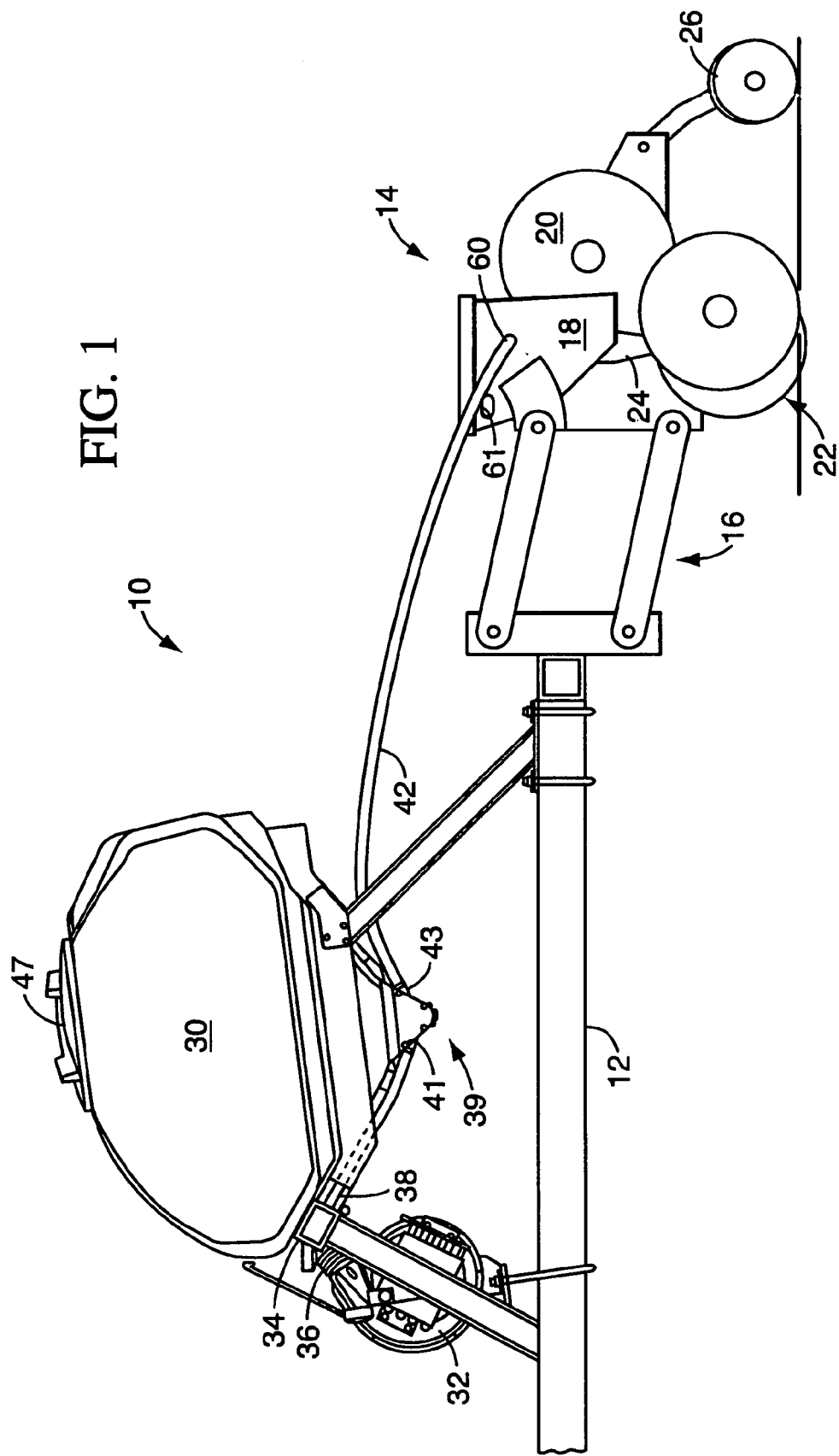
FIG. 1 is a side view of an agricultural planter using the subject product-on-demand delivery system.
Figure 2:
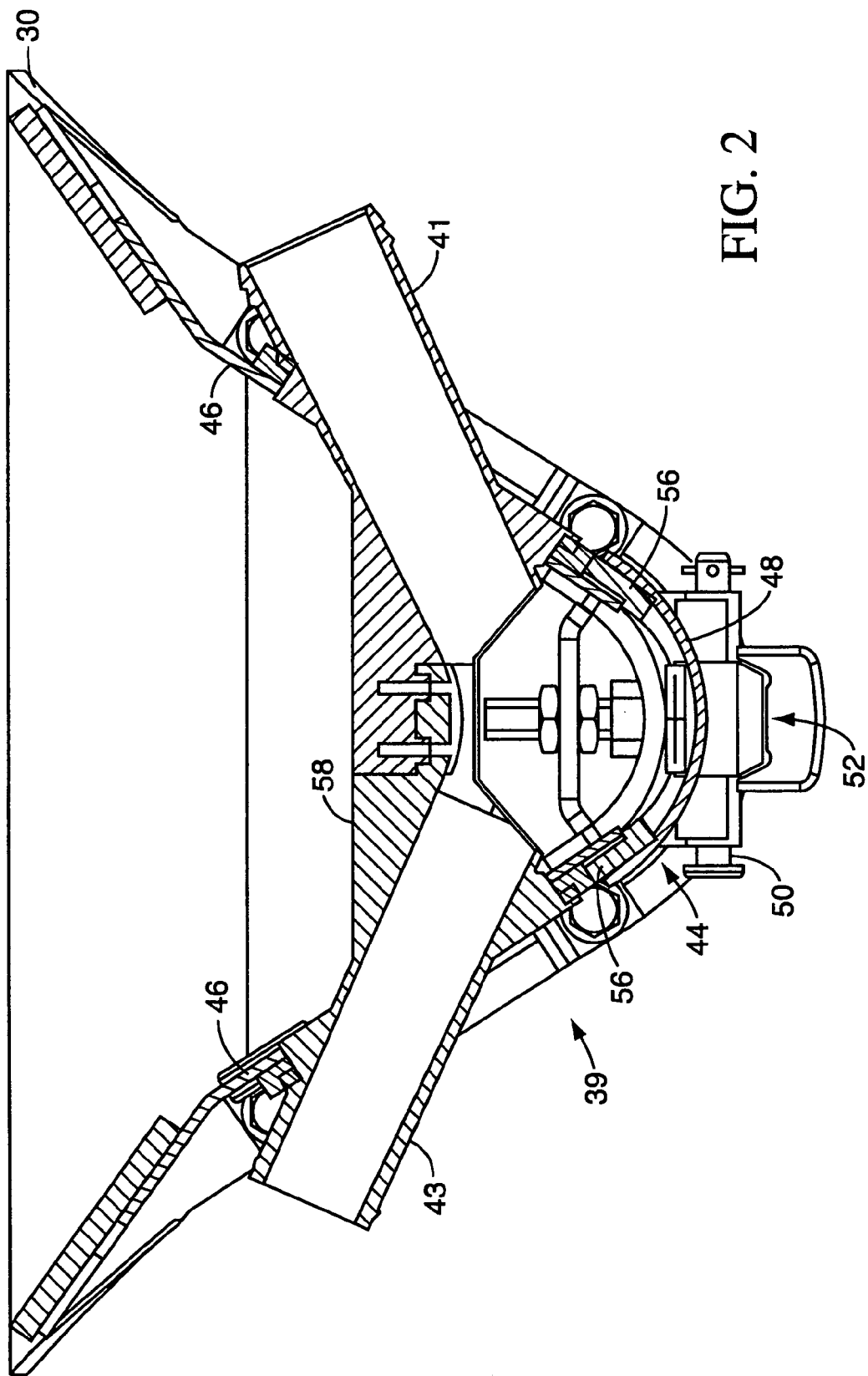
FIG. 2 is a side cross sectional view of the nozzle assembly of the product-on-demand delivery system.
Figure 3:
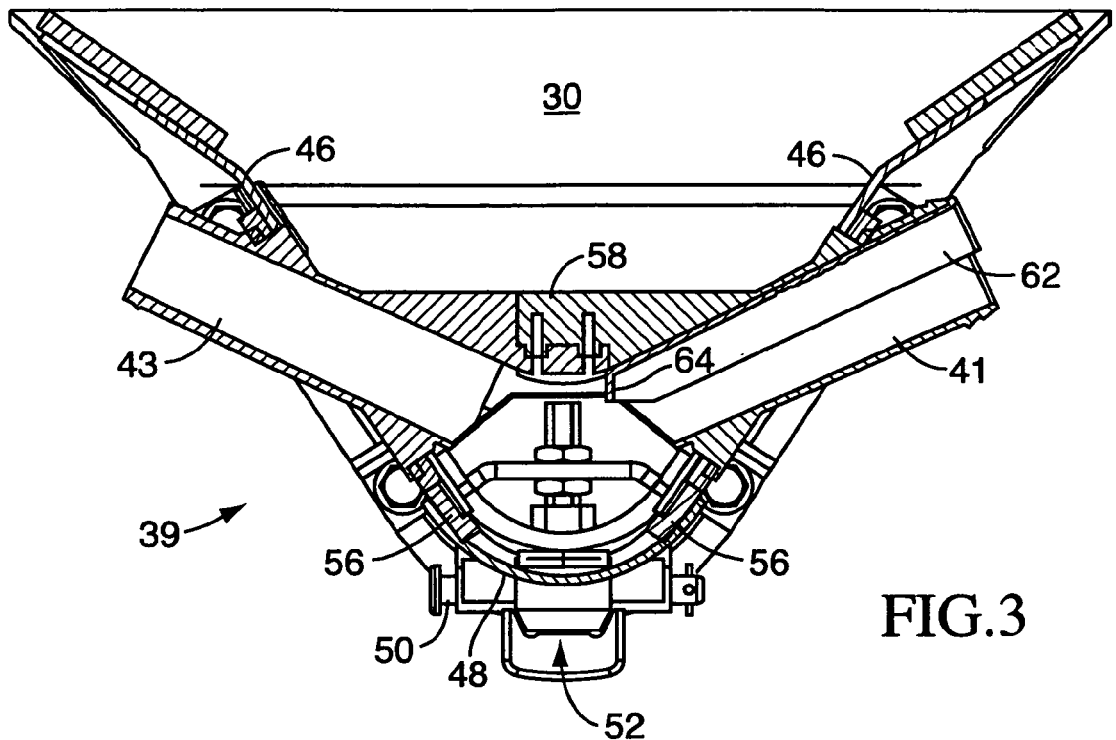
FIG. 3 is a side cross sectional view of the nozzle assembly of the product-on-demand delivery system having an air deflecting insert.
Figure 4:
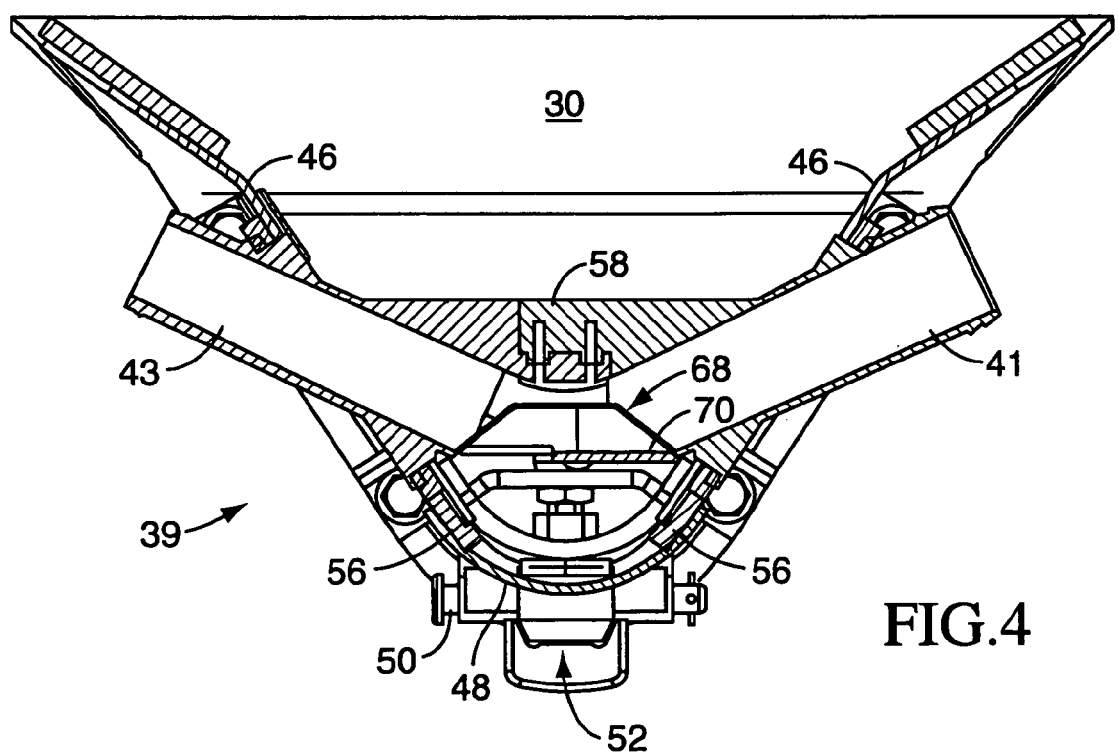
FIG. 4 is a side cross sectional view of the nozzle assembly of the product-on-demand delivery system having a product exposure limiting element.
Figure 5:
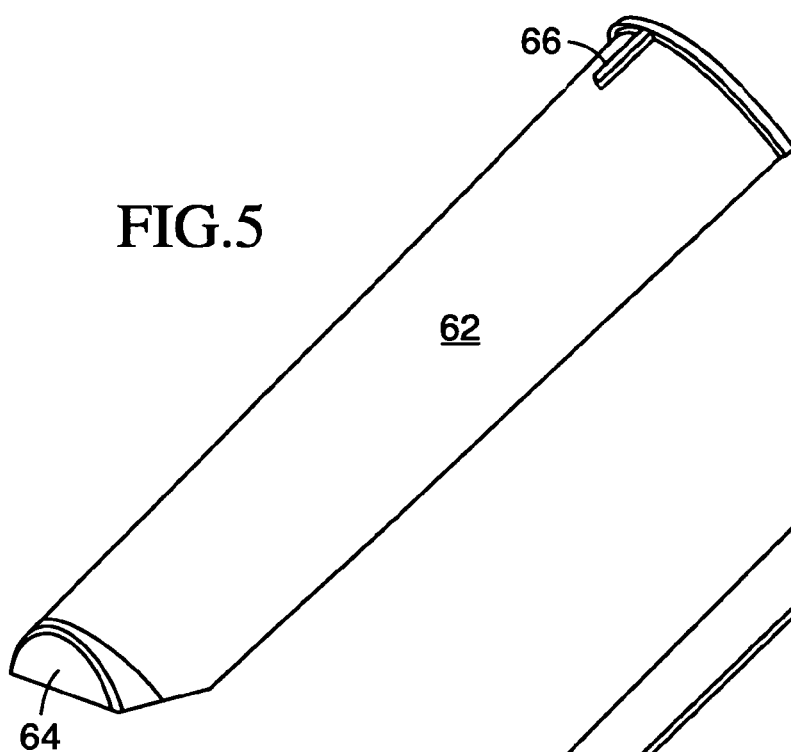
FIG. 5 is a top perspective view of the air deflecting insert.
Figure 6:
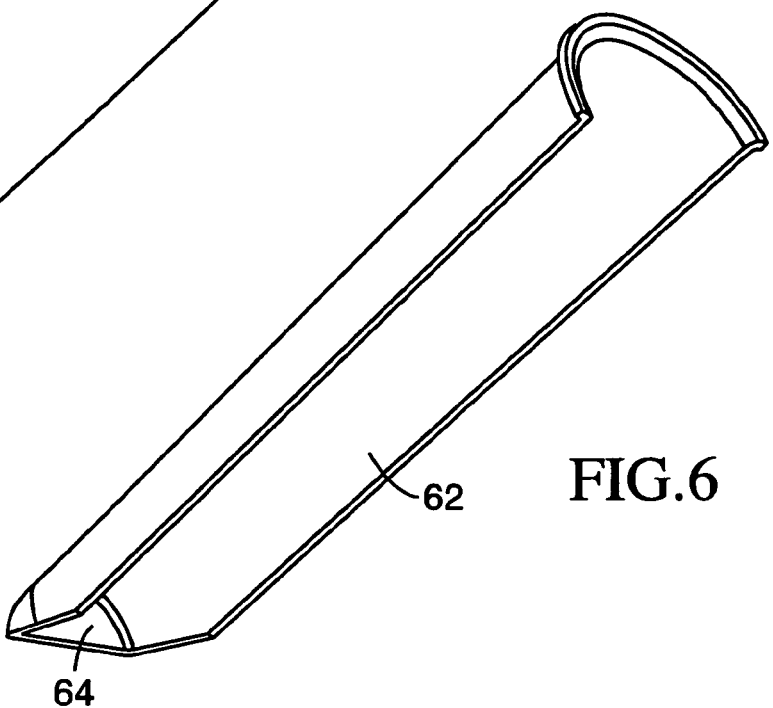
FIG. 6 is a bottom perspective view of the air deflecting insert.
Figure 7:
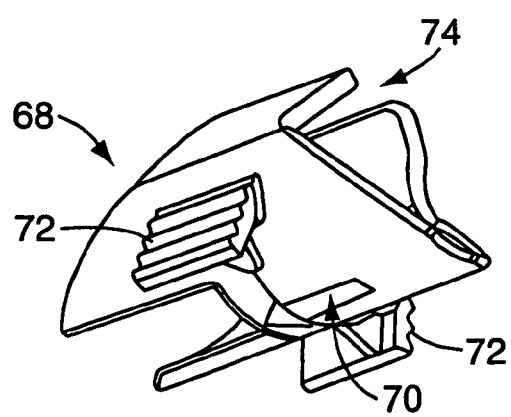
FIG. 7 is a bottom perspective view of the product exposure limiting element.
Figure 8:
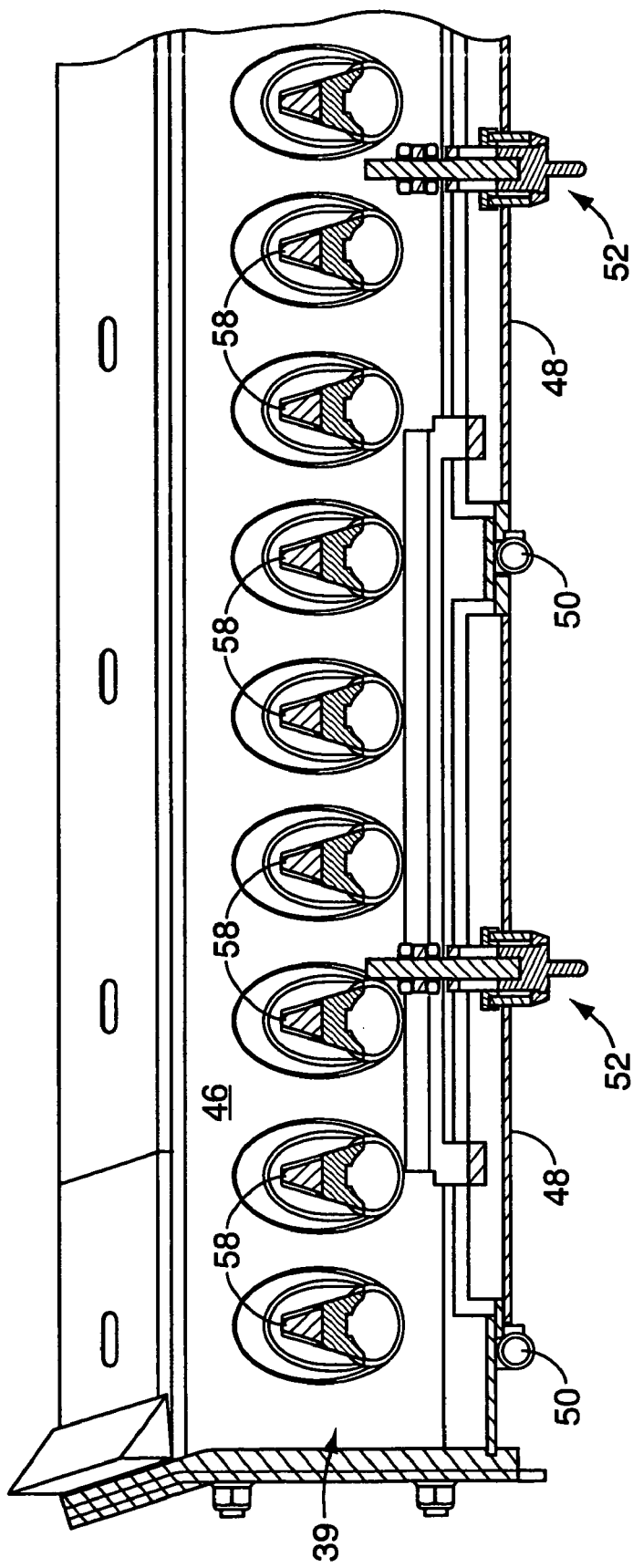
FIG. 8 is a front cross sectional view of the nozzle assembly of the product-on-demand delivery system.
Figure 9:
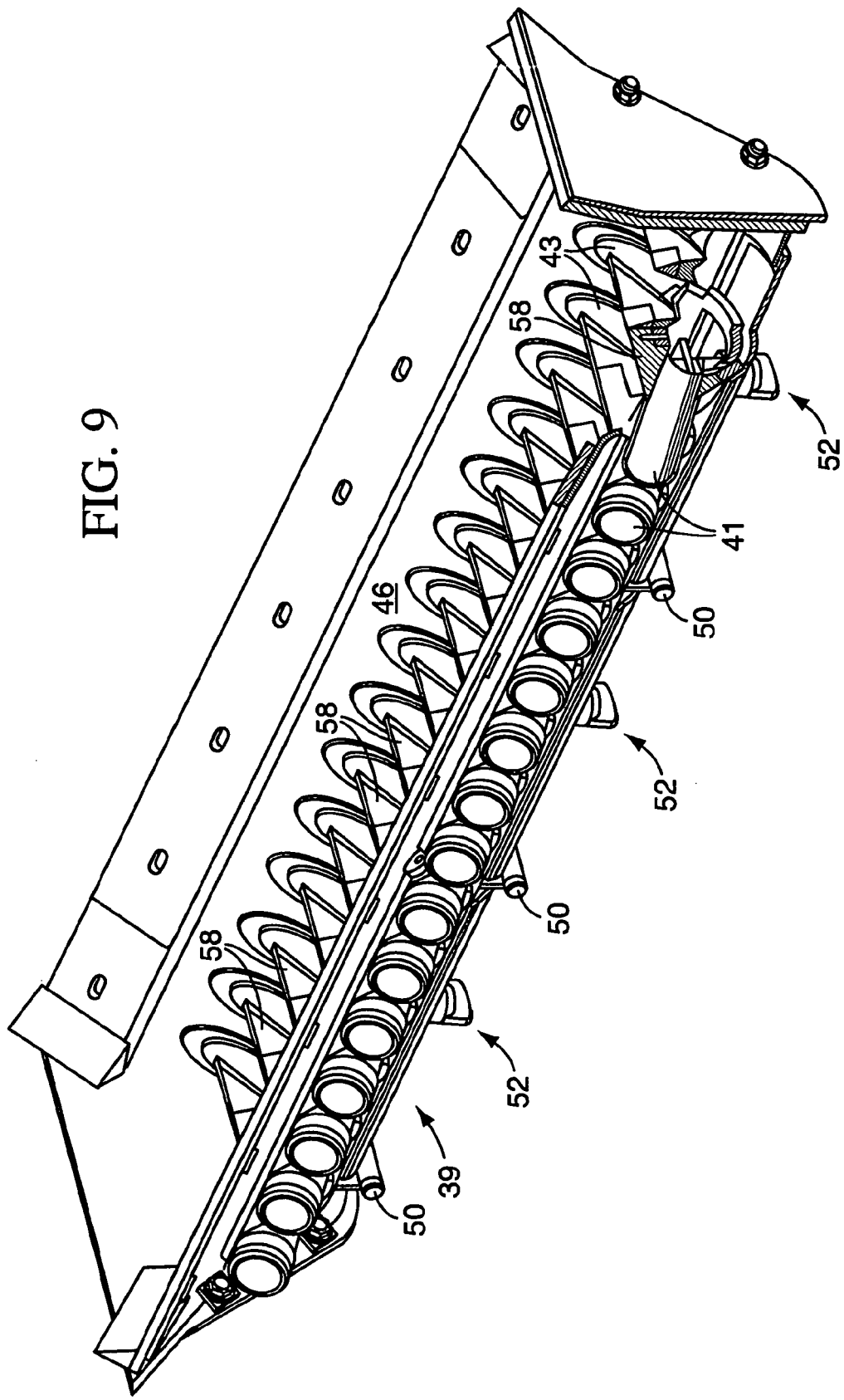
FIG. 9 is a front perspective and partial cross sectional view of the nozzle assembly of the product-on-demand delivery system.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

An agricultural seeding machine 10 comprises a frame 12 on which are mounted a plurality of individual planting units 14. The planting units 14 are coupled to the frame 12 by a parallelogram linkage 16 so that the individual planting units 14 can move up and down to a limited degree relative to the frame 12. Each of the individual planting units comprises an auxiliary seed hopper 18 for holding seed, a seed meter 20 for metering seed received from the auxiliary seed hopper 18 and a furrow opener 22 for forming a planting furrow in a field for receiving metered seed from the seed meter 20. The seed is transferred to the planting furrow from the seed meter by a seed tube 24. A closing assembly 26 is used to close the planting furrow with the seed contained therein. In the preferred embodiment the seed meter 20 is a vacuum seed meter, although other types of seed meters using mechanical assemblies or positive air pressure could also be used with the subject invention. It should be noted that the present invention could also be used to apply non-seed products to the field. For seed and non-seed products, the planting unit could be considered an application unit with an auxiliary hopper for holding product, a product meter for metering product received from the auxiliary hopper and an applicator for applying the metered product to a field. For example a dry chemical fertilizer or pesticide could be directed to the auxiliary hopper and metered by the product meter and applied to the field by the applicator.

The main frame 12 supports a main hopper 30 and an air pump 32. The air pump 32 is driven by a hydraulic motor; however other motor arrangements could be used, like electric motors for driving the air pump 32. The air pump 32 directs pressurized air to a manifold 34 through main air hose 36. The manifold 34 is formed from a hollow closed tubular support of the main frame 12. The manifold 34 is provided with a plurality of manifold outlets corresponding to the number of planting units 14 mounted to the frame 12. Individual air supply lines 38 extend from the manifold outlets and direct pressurized air from the manifold 34 to the upstream side of the nozzle assembly 39. The nozzle assembly 39 is located at the bottom of the main hopper 30. Product located in the main hopper 30 flows by gravity to the nozzle assembly 39. The upstream side of the nozzle assembly 39 is provided with a number of air inlets 41 corresponding to the number of air supply hoses 38. The air inlets 41 are spaced transversely along the upstream side of the nozzle assembly 39. The downstream side of the nozzle assembly 39 is provided with a number of product outlets 43 corresponding to the number of air supply hoses 38. The product outlets 43 are also spaced transversely along the downstream side of the nozzle assembly 39.

Each air inlet 41 is aligned with a respective product outlet 43. Product supply hoses 42 extend from the product outlets 43 to the individual auxiliary hoppers 18 for directing product entrained in the air stream to the auxiliary hoppers 18.

The nozzle assembly 39 is provided with a concave bottom 44 having outwardly diverging sidewalls 46. Product in the form of seed or non-seed product is placed in the main hopper 30 through a lid 48. Portions of the nozzle assembly 39 can be opened to form a cleanout door 48 as described in U.S. Pat. No. 6,609,468.

Each air inlet 41 and corresponding product outlet 43 are formed from two plastic parts. The two plastic parts are pinned together by integral pins formed on one of the parts and receiving apertures formed on the other. The air inlet 41 is angled downwardly relative to the concave bottom 44 and correspondingly the product outlet 43 is angled upwardly relative to the concave bottom 44. An integral baffle 58 extends between the air inlet 41 and the product outlet 43. The baffle 58 is peaked and is located above the air stream passing from the air inlet 41 to the product outlet 43. The downwardly angled air inlet 41 prevents product from backing up into the air supply hose 38, whereas the upwardly angled product outlet 43 prevents product from flowing into and clogging the product supply hose 42.

Adjacent air inlet 41/product outlet 43 combinations are transversely spaced from one another so that seed or non-seed product can pass on either side of the baffles 58 and puddle beneath the baffles 58. An air stream passing from the air inlet 41 to the product outlet 43 picks up product located in the puddle and directs it through product supply hose 42 to the auxiliary hopper 18. The transfer of product from the main hopper 30 to the auxiliary hoppers 18 is done automatically as product is needed by the auxiliary hopper 18. As an individual auxiliary hopper 18 fills up with product, the auxiliary hopper product inlet 60 becomes covered by product blocking and slowing the air stream so that the air stream no longer picks up product in the main hopper 30 and transports the product to the auxiliary hopper 18. Conversely, as product is used up by the product meter 20, the auxiliary hopper product inlet 60 is uncovered and the air stream again picks up product for delivery to the auxiliary hopper 18. In this way the auxiliary hoppers 18 are always and automatically provided with product. The side walls of the auxiliary hoppers 18 are provided with screen vents 61 for venting air pressure in the auxiliary hoppers 18. The vent screens 61 can also be located in the lids of the auxiliary hoppers 18 as long as the vent screens 61 are above the respective product inlets.

In some situations product having large particles, like large seeds (corn and soybeans), are difficult for the air stream to pick up. To accommodate large seed, the air inlet 41 may be provided with an insert 62 having an air stream deflecting portion 64 that deflects a portion of the air stream downwardly to agitate the seed in the seed puddle and capture the seed in the air stream passing into the product outlet 43. The insert is provided with a locating tang 66 that engages a slot formed in the air inlet 41 to correctly orient the insert 62 and the air deflecting portion 64.

In other situations the seed or non-seed product may be too light and will be readily carried by even a small air stream. To overcome this problem the baffles 58 may be provided with an element 68. The element 68 can be clipped on to the baffles 58. The element has an obstructing bottom 70 that limits the amount of product exposed to the air stream. Element 68 is made of plastic and is provided with finger grips 72. By compressing the finger grips 72 the upper gap 74 is opened so that the clip can be clipped to the baffles 58.

Figure 10:
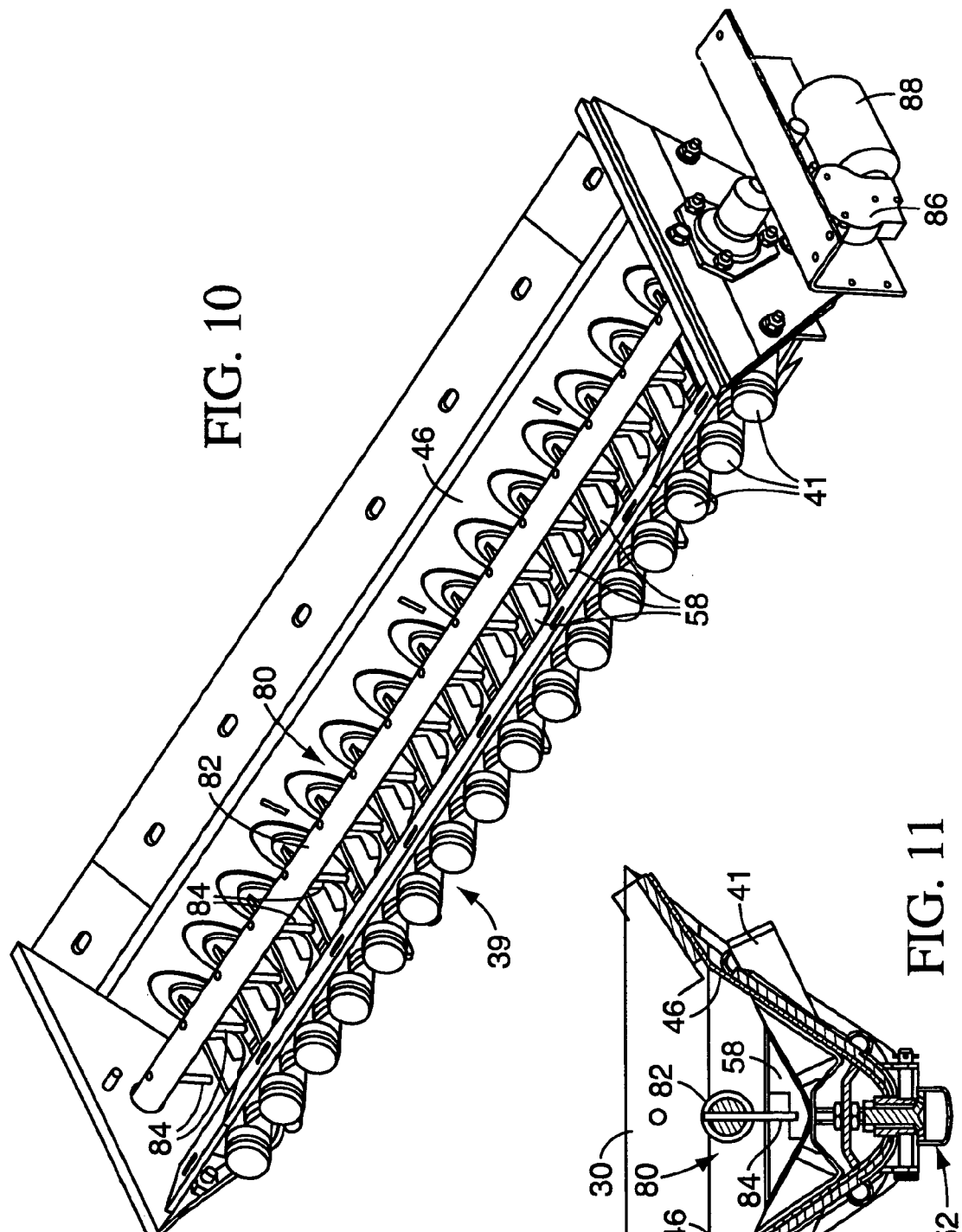
FIG. 10 is a front perspective view of the nozzle assembly being provided with an agitator assembly.

In an alternative embodiment, the large seed insert 62 can be eliminated in favor of an agitator assembly 80. The agitator assembly 80 comprises a transverse rod 82 extending across the nozzle assembly 39. The transverse rod 82 is provided with a plurality of radially extending fingers 84. As shown, in FIG. 10 the fingers are transversely aligned with one another.

Figure 11:
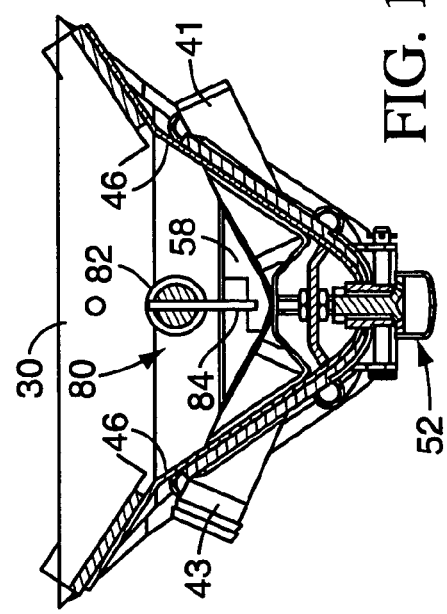
FIG. 11 is a cross sectional view of the nozzle assembly being provided with an agitator assembly.

The transverse rod 82 is rotated back and forth by a gearbox 86 being driven by a motor 88. At the bottom dead center position of the fingers 84 they extend between the individual nozzles defined by the aligned air inlets 41 and the product outlets 43. In this way the fingers 84 sweep the area between the nozzles. The gear box/motor assembly 86/88 drive the transverse rod fifty-one and one-half degrees in each direction from the bottom dead center illustrated in FIG. 11. As such, the fingers 84 sweep an arc of one-hundred three degrees.

Figure 12:
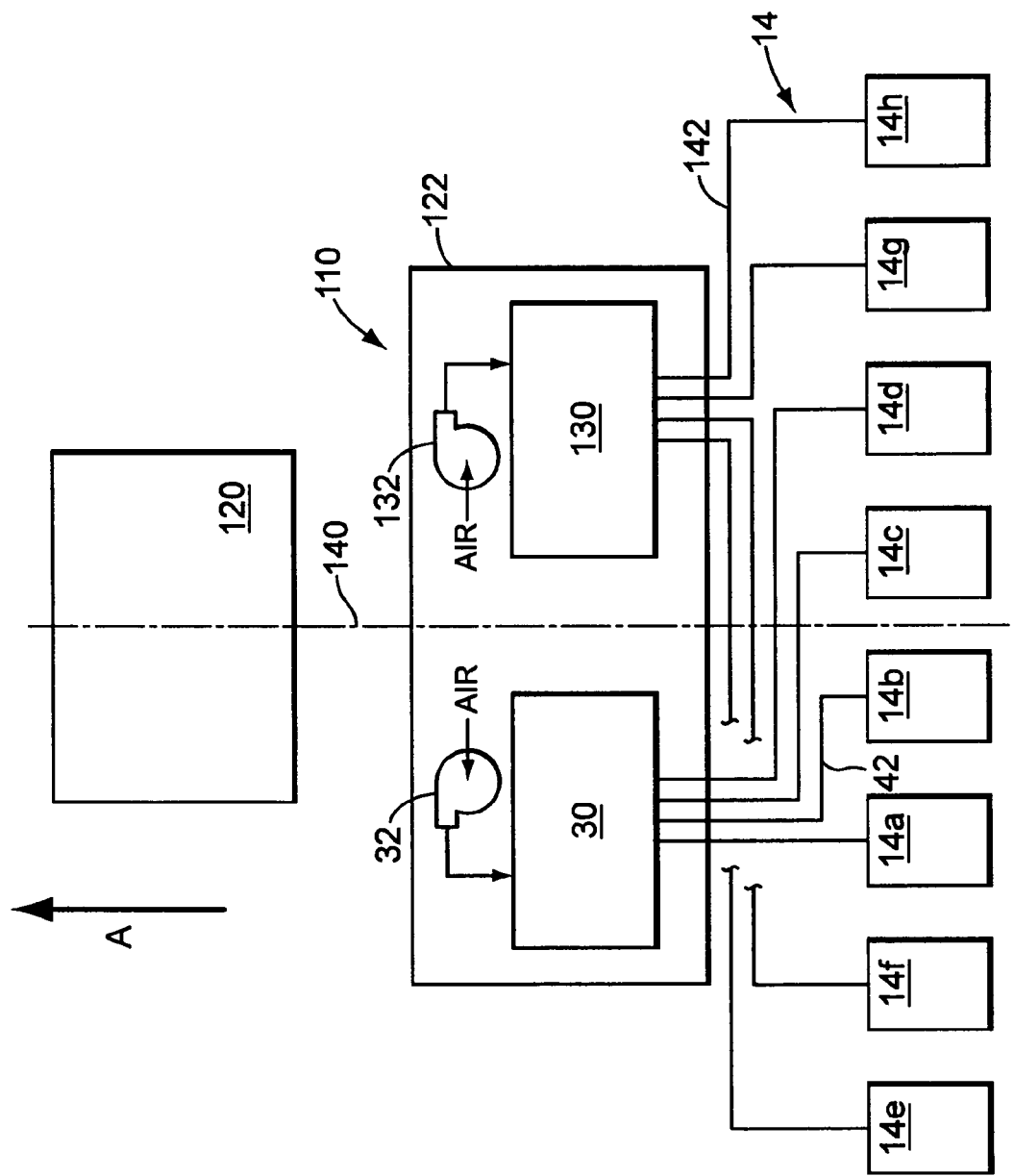
FIG. 12 is a schematic plan view of a product-on-demand delivery system according to an embodiment of the invention.

FIG. 12 illustrates in schematic, block diagram fashion an exemplary embodiment of the invention, embodied as planting machine 110. A vehicle, such as a tractor 120, pulls the machine 110 in the direction "A" through a field. The machine includes a frame 122 that carries first and second main product hoppers or tanks 30, 130. The frame pulls a plurality of application units 14 as described above with respect to the embodiment of FIG. 1. The application units are individually identified as 14a–14h. The four application units near a center line 140 of the application units are identified as 14a–14d and the four furthest from the center line 140 are identified as 14e–14f. Although eight application units 14 are shown, it is understood that fewer or more application units are encompassed by the invention. The invention is particularly advantageous when two main hoppers or tanks 30, 130 and thirty two application units 14 are used.

According to the system shown in FIG. 12, the first main hopper 30 is charged with the air pump 32 as described above with respect to the embodiment of FIG. 1, while the second main hopper 130 is charged with a separate air pump 132. Each application unit of the group 14a, 14b, 14c and 14d that is nearest to the centerline 140 of the machine 110 is connected by a hose 42 to the first main hopper 30, as described above with respect to the embodiment of FIG. 1. Application units 14e, 14f, 14g, 14h are each connected by a longer hose 142 to the second main hopper 130 in like fashion. According to this arrangement, because the application units 14e, 14f, 14g, 14h are furthest from the centerline 140 of the machine 110, an increased pressure in the second main hopper 130 is advantageous to overcome the increased pressure drop within the hoses 142 to ensure delivery of the product to these far units.

According to the invention, the pump 132 charges the second main hopper 130 at a pressure higher than the pump 32 charges the first main hopper 30. According to this embodiment, a greater degree of control of product delivery air pressure ensures that the close application units are not over-pressured or over-fed with product compared to the furthest application units.

Figure 13:
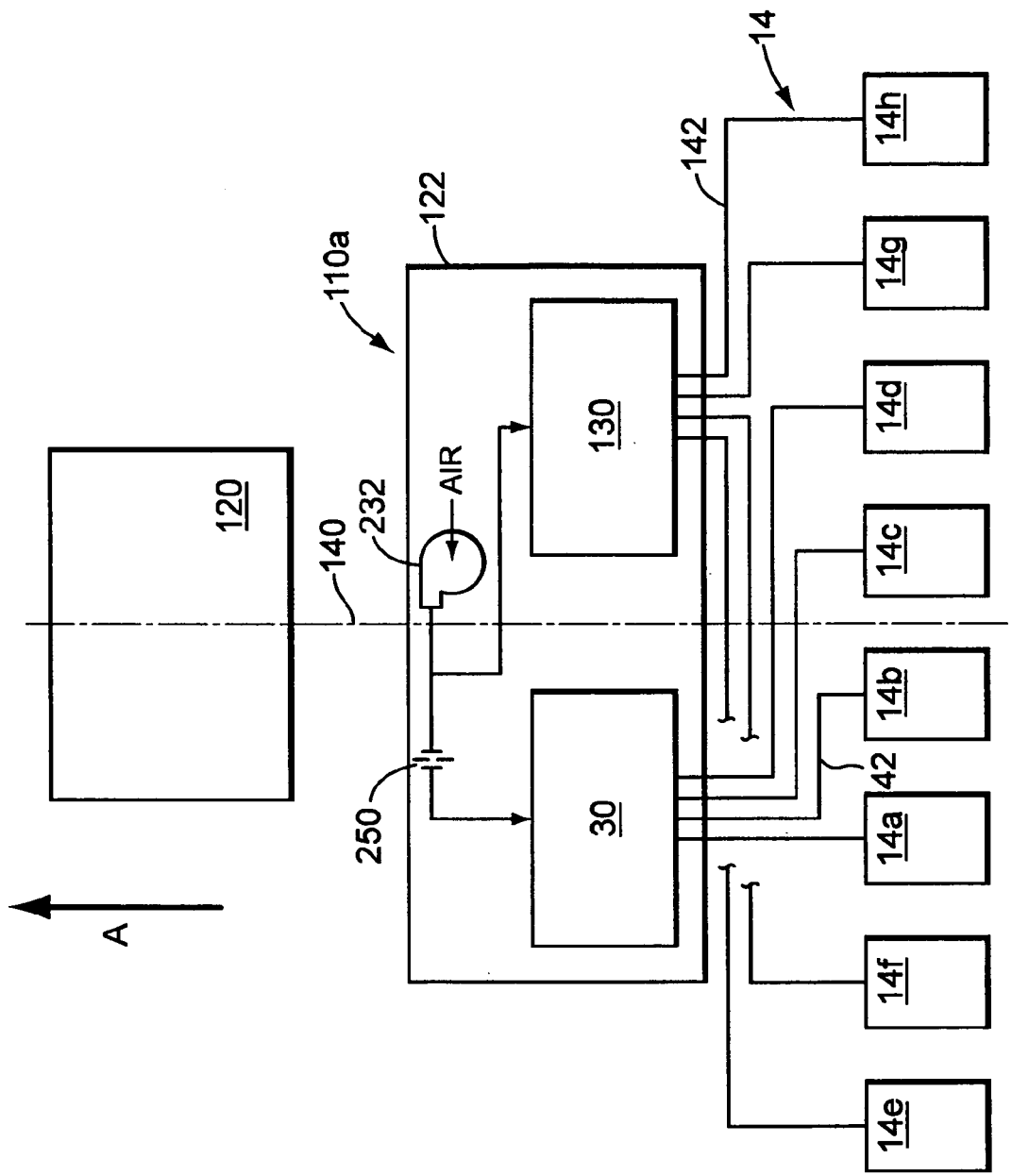
FIG. 13 is a schematic plan view of a product-on-demand delivery system according to an alternate embodiment of the invention.

FIG. 13 illustrates in schematic, block diagram fashion an exemplary further embodiment of the machine 110a, wherein a single pump 232 charges both of the main hoppers 30, 130. However, according to this system, a restriction 250, such as an orifice, is located between the pump 232 and the first main hopper 30, but not between the pump 232 and the second main hopper 130. Thus, the pump 232 can be set to the higher pressure necessary for the second main hopper 130 to deliver the product to the furthest application units whereas the restriction 250 reduces the pressure to the first main hopper 30 which delivers product to the closest application units. The restriction 250 can alternatively be a manually adjustable damper or a control damper.

Figure 14:
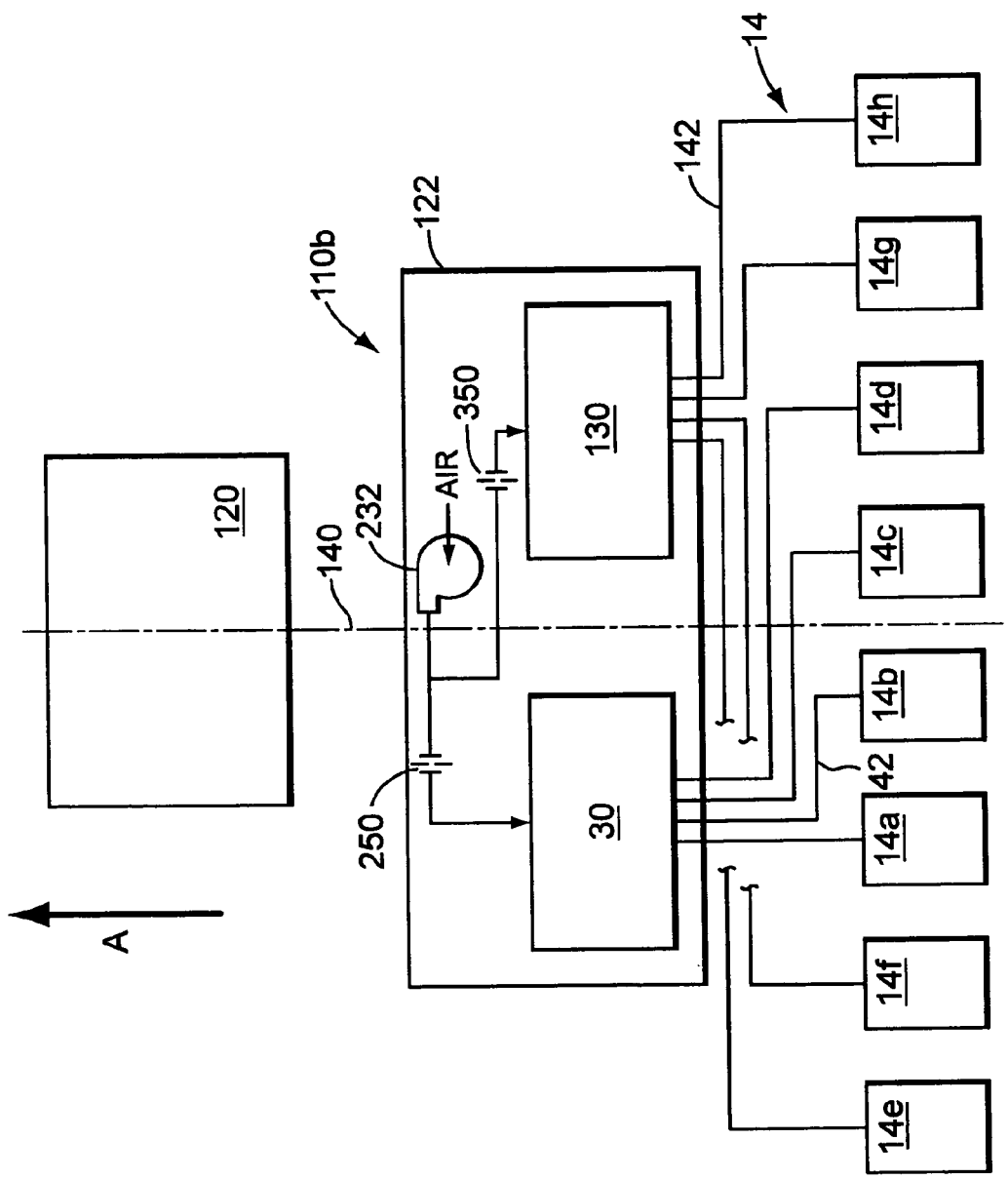
FIG. 14 is a schematic plan view of a product-on-demand delivery system according to an alternate embodiment of the invention.

FIG. 14 illustrates an alternate embodiment machine 110b wherein the pump 232 is common to the hoppers 302, 130 but a restriction 350 is also included between the pump 232 and the hopper 130. The restrictions 250, 350 can be pre-selected to vary the operating pressure within the two hoppers 30, 130. The restrictions 250, 350 can be orifices, manually adjustable dampers or control dampers.

Regarding the embodiment of FIGS. 12–14, when thirty two application units 14 are used, the centermost sixteen application units 14 can be hose-connected to the first main hopper 30 and the outside sixteen application units (eight on each side of the centermost sixteen application units) can be hose-connected to the second main hopper 130, operated at the higher air pressure.

Figure 15:
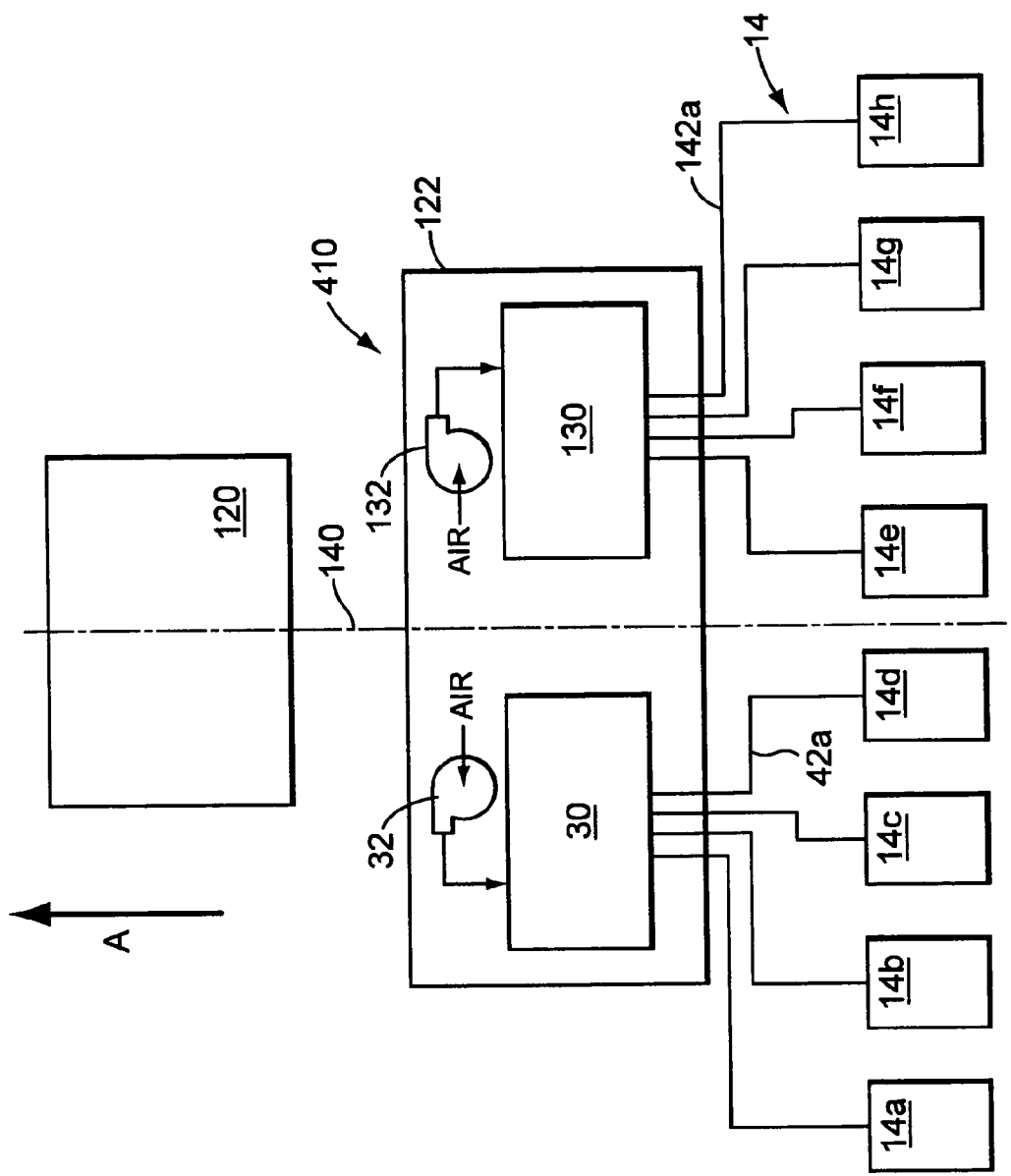
FIG. 15 is a schematic plan view of a product-on-demand delivery system according to an alternate embodiment of the invention.
Figure 16:
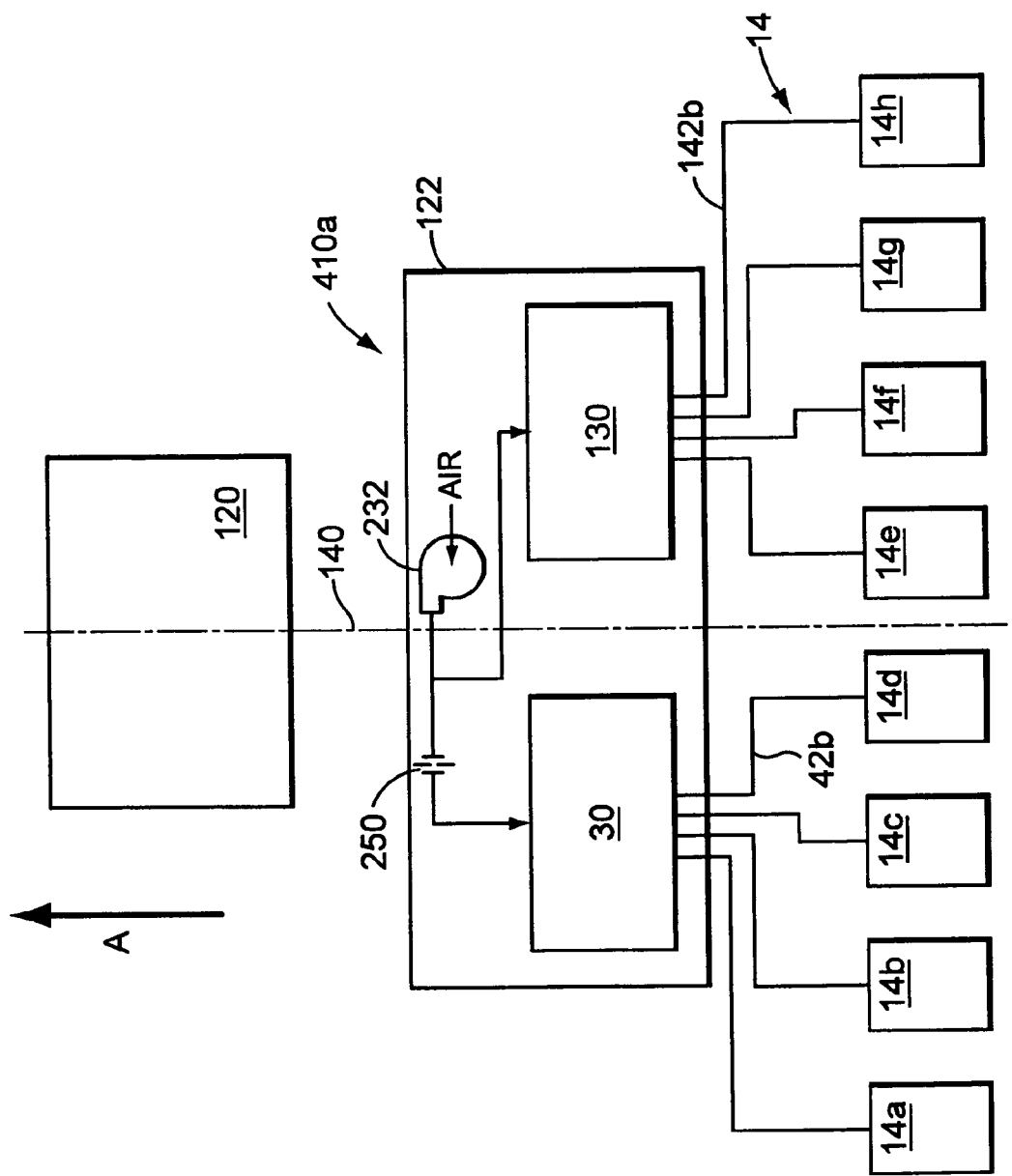
FIG. 16 is a schematic plan view of a product-on-demand delivery system according to an alternate embodiment of the invention.
Figure 17:
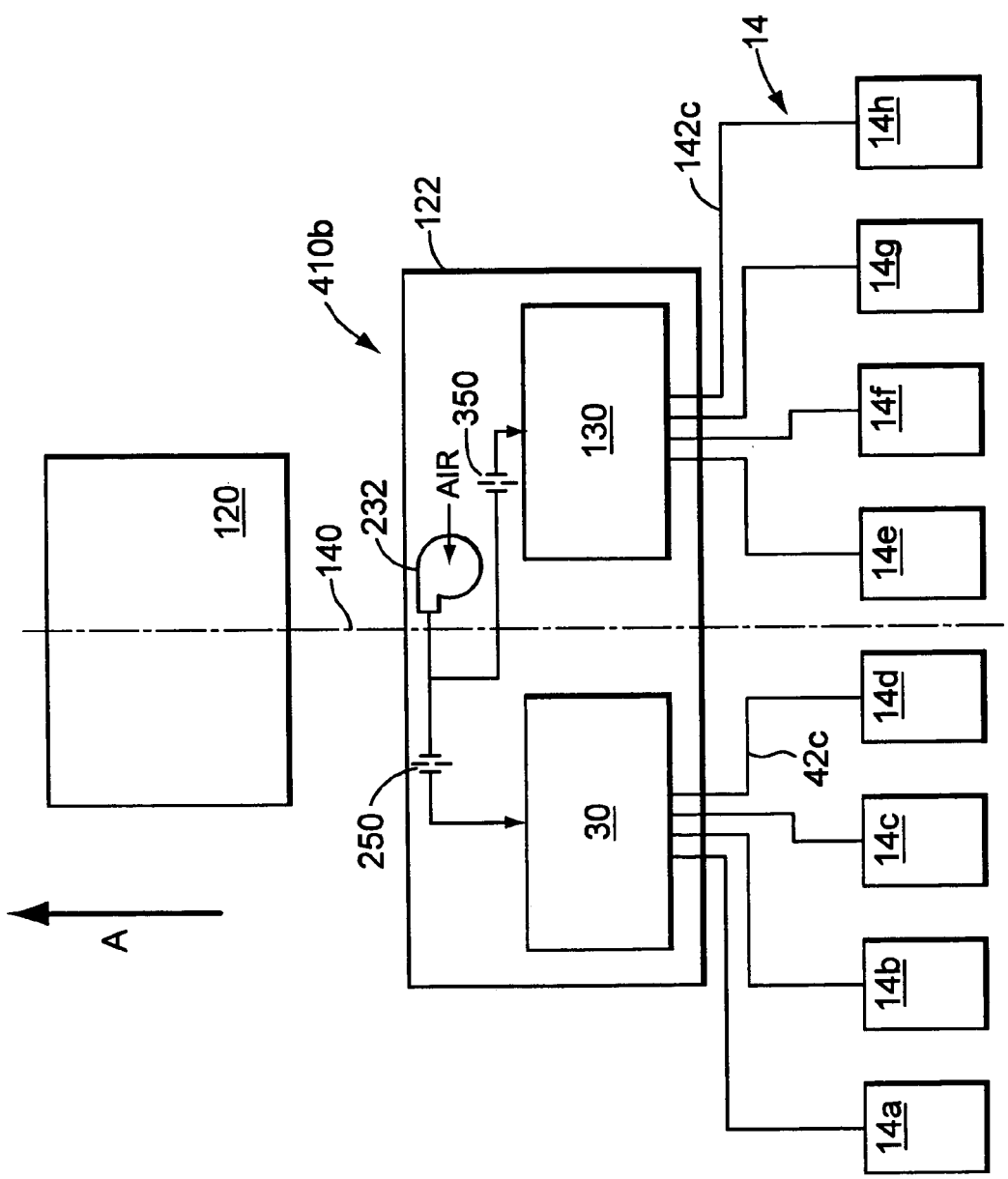
FIG. 17 is a schematic plan view of a product-on-demand delivery system according to an alternate embodiment of the invention.

FIGS. 15–17 illustrates further embodiments of the machine 410–410b similar to the embodiment of FIGS. 12–14 except the hoses 42a, 142a and routed to different sides of the machine 410. According to the embodiments of FIGS. 15–17, different seed varieties, treatments, sizes, shapes, etc. or different crops can be dispensed from the hoppers 30, 130 to different rows of application units, for example, the product dispensed from application units 14a–14d could differ from the product dispensed from application units 14e–14h.

FIG. 15 uses two air pumps 32, 132 to pressurize the first and second grain hoppers 30, 130 to different pressures.

FIG. 16 illustrates an alternate embodiment to that illustrated in FIG. 15 except that the common pump 232 pressurizes both hoppers with the restriction 250 acting to depress the pressure in the first main hopper 30.

FIG. 17 illustrates an alternate embodiment to that shown in FIG. 16 wherein the further restriction 350 is used between the common pump 232 and the second main hopper 130. According to this embodiment the restrictions 250, 350 can be selected to set the relative pressures of the main hoppers 30, 130.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A product-on-demand delivery system for agricultural product, said system comprising:
a frame;
a first main hopper mounted on the frame;
a second main hopper mounted on the frame, each of the first and second main hoppers having a nozzle with a product opening into which product in the respective main hopper is directed, the nozzle having an air inlet for the introduction of pressurized air, and a product outlet for the export of pressurized air and entrained product;
a first application unit and a second application unit mounted to the frame, each application unit having a product meter for dispensing the product onto a field, the product meter of the first application unit in communication with the first main hopper, the product meter of the second application unit in communication with the second main hopper;
a first air pump flow-coupled to the air inlet of the nozzle of the first main hopper; and
a second air pump flow-coupled to the air inlet of the nozzle of the second main hopper.

2. The product-on-demand delivery system as defined by claim 1, wherein said second air pump generates a higher air pressure than said first air pump.

3. The product-on-demand delivery system as defined by claim 2, wherein the second main hopper is maintained at a higher operating pressure than said first main hopper.

4. The product-on-demand delivery system according to claim 1, wherein said second application unit is further from said second main hopper than said first application unit is from said first main hopper.

5. The pressure-on-demand delivery system according to claim 1, further comprising a plurality of additional first application units having additional first product materials in communication with said first main hopper and a plurality of additional application units having additional second product meters in communication with said second main hopper, said first application units arranged on one side of the frame and said additional second application units arranged on an opposite side of said frame.

6. A product-on-demand delivery system for agricultural product, said system comprising:
a frame;
a first main hopper mounted on the frame;
a second main hopper mounted on the frame;
a plurality of first application units mounted to the frame;
a plurality of second application units mounted to the frame, each application unit having a product meter for dispensing the product onto a field, the product meters of the first application unit in communication with the first main hopper, the product meters of the second application unit in communication with the second main hopper;
a first source of pressurized air flow-coupled to the first main hopper; and
a second source of pressurized air flow-coupled to the second main hopper, said second main hopper at a higher pressure than said first main hopper, wherein pressurized air from said first and second main hoppers deliver product to said product meters of said first and second application units, wherein said product meter of one of said second application units is further from said second main hopper than any product meter of said first application unit is from said first main hopper, the higher pressure of said second main hopper pre-selected to compensate for increased pressure drop to said one second application unit.

7. The product-on-demand delivery system according to claim 6, wherein said first source comprises a first air pump and said second source comprises a second air pump.

8. The product-on-demand delivery system according to claim 6, wherein said first and second sources comprise a common air pump and wherein said first source comprises an additional flow restriction between said common air pump and said first main hopper, said additional flow restriction configured to depress the air pressure within said first main hopper to a lower level than the air pressure within said second main hopper.

9. The pressure-on-demand delivery system according to claim 6, wherein said first application units are arranged on one side of the frame and said additional second application units are arranged on an opposite side of said frame.

10. A product-on-demand delivery system for agricultural product, said system comprising:
- an implement frame that can be transported through a field;
- a first main seed hopper mounted on the frame, a second main seed hopper mounted on the frame, each main seed hopper having a nozzle assembly into which product in the main hopper is directed by gravity, the nozzle assembly having an upstream sidewall including an inlet, a downstream sidewall including a product outlet and a bottom;
- a first planting unit mounted to the frame, and a second planting unit mounted to the frame, each planting unit provided with a seed meter for metering seed, and a furrow opener for forming a planting furrow into which metered seed is deposited, the seed meter of the first planting unit coupled to the first main seed hopper by a first product supply hose coupled to the product outlet of the first main seed hopper, the seed meter of the second planting unit coupled to the second main seed hopper by a second product supply hose coupled to the product outlet of the second main seed hopper;
- a first source of pressurized air pneumatically coupled to the nozzle assembly of the first main seed hopper, the first source of pressurized air generating an air stream into the air inlet that is coupled to the upstream sidewall of the nozzle assembly opposite the product outlet of the first main seed hopper, so that the air stream passes from the air inlet to the product outlet through the nozzle assembly, so that seed located in the bottom of the nozzle assembly is taken up by the air stream and is directed through the first product supply hose to the seed meter of the first planting unit; and
- a second source of pressurized air pneumatically coupled to the nozzle assembly of the second main seed hopper, the second source of pressurized air generating an air stream into the air inlet that is coupled to the upstream sidewall of the nozzle assembly opposite the product outlet of the second main seed hopper, so that the air stream passes from the air inlet to the product outlet through the nozzle assembly, so that seed located in the bottom of the nozzle assembly is taken up by the air stream and is directed through the second product supply hose to the seed meter of the second planting unit, wherein said first or second sources of pressurized air are configured to ensure that said second main seed hopper is at a higher air pressure than said first main seed hopper by a pre-selected amount.

11. The product-on-demand delivery system according to claim 10, wherein said first source comprises a first air pump and said second source comprises a second air pump.

12. The product-on-demand delivery system according to claim 10, wherein said first and second sources comprise a common air pump, and wherein said first source comprises a flow restriction between said common air pump and said air inlet of the nozzle of the first main hopper, said restriction configured to depress the air pressure within said first main hopper below the air pressure within said second main hopper.

13. The product-on-demand delivery system according to claim 12, wherein said second source comprises a further flow restriction between said common air pump and said air inlet of the nozzle of the second main hopper.

14. The product-on-demand delivery system according to claim 10, wherein each planting unit is provided with an auxiliary seed hopper located between the product outlet and the seed meter.

15. The product-on-demand delivery system according to claim 10, wherein said second planting unit is further from said second main seed hopper than said first planting unit is from said first main seed hopper.

* * * * *